Patented Oct. 21, 1952

2,615,047

UNITED STATES PATENT OFFICE 2,615,047

RECOVERY OF XYLIDINES

Stanley Francis Birch, Frederick Arnold Fidler, and Ronald Alfred Dean, Sunbury-on-Thames, England, assignors to Anglo-Iranian Oil Company Limited, London, England, a British joint-stock corporation No Drawing. Application May 21, 1947, Serial No. 749,598. In Great Britain May 24, 1946

3 Claims. (Cl. 260—582)

The invention relates to the recovery of xylidines and more particularly to the recovery of ortho-4-xylidine and meta-2-xylidine from coal tar xylene, and the invention has among its objects to secure higher yields of those products.

Xylidines, which are used extensively in the manufacture of dyestuffs and fine chemicals, are usually obtained by nitrating coal-tar xylene, and reducing the material so obtained to yield a mixture of the amines. These processes are well known in the art. The resulting amine mixture if treated with acetic acid, and the acetate of meta-4-xylidine is separated and the amine regenerated. The residue after separation of the acetate of meta-4-xylidine is treated with hydrochloric acid, and the hydrochloride of para-xylidine is separated and obtained in a pure state by re-crystallisation from water.

In the following description the liquors remaining after the re-crystallisation of para-xylidine hydrochloride from water are referred to as "mother liquors," and the residue remaining after the separation of meta-4-xylidine and crude para-xylidine hydrochloride, as hereinbefore described, is referred to as "xylidine residues." The known process may be represented diagrammatically as follows:

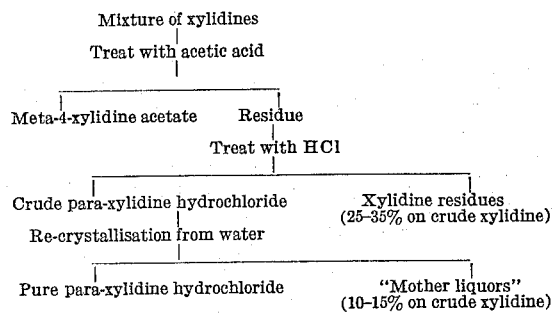

It is the usual present day practice to treat the original mixture of xylidines for the recovery therefrom of meta-4-xylidine and para-xylidine, and to regard the mother liquors and xylidine residues as waste products that are not further treated. Since the mother liquors amount to 10–15% of the crude xylidines and the xylidine residues amount to 25–35% of the crude xylidines, the present day practice is wasteful.

We have found that by simple methods it is possible to recover substantial yields of valuable products, especially meta-2-xylidine and ortho-4-xylidine, from the mother liquors and xylidine residues referred to.

According to the process of the invention the xylidine residues hereinbefore defined are treated with alkali for the regeneration of the free amines.

The xylidines thus obtained are fractionated in a fractionating column having the equivalent of at least twenty theoretical plates operated at a reflux ratio of not less than 10:1, and under reduced pressure, generally not exceeding 50 mm. mercury to yield two fractions, namely, a lighter fraction boiling up to 97° C. at 10 mm. mercury pressure and a heavier fraction boiling above that temperature. From the higher boiling fraction on cooling to about 0° C. crude solid ortho-4-xylidine separates out and is filtered off; and the filter cake is further treated by re-distillation or by crystallisation for the recovery of pure ortho-4-xylidine.

The yield of ortho-4-xylidine so obtained is of the order of 16–17% of the original xylidine residues, while the filtrate consists principally of an equimolecular mixture of ortho-3- and ortho-4-xylidines, and may be further treated as by refractionation or by recycling to the distillation stage.

According to a modification of the process of the invention, the xylidine mother liquors from the crystallisation of para-xylidine hydrochloride are treated with alkali and the amines regenerated. The xylidines thus obtained are fractionated in an efficient column having the equivalent of at least twenty actual plates operated at a reflux ratio of not less than 15:1 and under reduced pressure generally not exceeding 50 mm. mercury pressure, for the production of a light fraction boiling up to about 96° C. at 10.5 mm. of mercury, which light fraction contains about 70 to 75% of meta-2-xylidine. The crude meta-2-xylidine thus obtained may be further concentrated and purified according to known methods as by means of organic derivatives such as the formyl compound or through a salt formed with a mineral acid.

Preferably the xylidine residues or mother liquors are admixed with aqueous sodium hydroxide solution and steam distilled for the regeneration of the free amines prior to fractional distillation in accordance with the process of the present invention.

The process of the invention is illustrated but in no way limited by the following examples:

EXAMPLE 1

Xylidine residues as hereinbefore described were charged to a still after purification by steam distillation from caustic soda solution. The fractionating column used was equivalent to about 20 theoretical plates, and the distillation was carried out at a pressure of 10 mm. of mercury. Two fractions were collected from this distillation, after the removal of a small amount of light ends (toluidines and aniline) as indicated in the following table:

Table

| Fraction | Boiling Range at 10 mm. | Weight percent of xylidine residues | Nature of fraction |
|---|---|---|---|
| 1 | Up to 97° C | 62.2 | Mixed xylidines. |
| 2 | Above 97° C | 36.9 | Crude ortho-xylidine. |

The remainder of the material represents distillation loss and a small residue which was not distilled.

The material distilling above 97° C. and comprising 36.9% of the total charge was filtered. The solid so obtained from this was 44% of the crude ortho-xylidine. The filtrate may be refractionated or in a continuous process recycled to the distillation stage, when a further quantity of solid material may be recovered. The solid is substantially ortho-4-xylidine, and may be used as obtained or purified, for example by refractionation, crystallisation from petroleum ether, crystallisation of the sulphate or other known means.

EXAMPLE 2

The amines recovered from the mother liquors remaining after the recrystallisation of para-xylidine hydrochloride were distilled in a similar column to that used in Example 1, the pressure being 10.5 mm. The fraction distilling between 94° and 96° C. was collected and proved to be substantially meta-2-xylidine. This fraction comprised 52% of the whole. The discarded fractions from this distillation may be recycled for example for the crystallisation of para-xylidine hydrochloride, or to the hydrochloric acid treatment of the xylidines.

We claim:

1. A process for the recovery of ortho-4-xylidine from xylidine residues, said residues having been obtained by treating a crude mixture of xylidine with acetic acid, separating the acetate of meta-4-xylidine, regenerating free amine from the residue, treating the free amine with hydrochloric acid and separating the hydrochloride of para-xylidine, which comprises regenerating free amines from said xylidine residues by treatment with alkali and fractionally distilling the said amines so regenerated from xylidine residues in a fractionating column having the equivalent of at least 20 theoretical plates and operated at a reflux ratio of not less than 10:1 and under a pressure not exceeding 50 mm. pressure of mercury, to yield a fraction having an initial boiling point of 97° C. at 10 mm. pressure of mercury and consisting essentially of ortho-4-xylidine.

2. A process according to claim 1, in which the xylidine residues are admixed with an aqueous solution of sodium hydroxide and steam distilled for the regeneration of the free amine prior to the fractional distillation.

3. A process according to claim 2 in which the crude xylidine is a material obtained by nitrating crude coal tar xylene and reducing the nitroxylenes so formed to xylidines.

STANLEY FRANCIS BIRCH.
FREDERICK ARNOLD FIDLER.
RONALD ALFRED DEAN.

REFERENCES CITED

The following references are of record in the file of this patent:

UNITED STATES PATENTS

| Number | Name | Date |
|---|---|---|
| 1,844,362 | Ihrig | Feb. 9, 1932 |
| 2,187,820 | Lecher | Jan. 23, 1940 |

OTHER REFERENCES

Hodgkinson et al.: "J. Chem. Soc." (London), 77, 65–68 (1900).

Kruber et al.: "Ber. deut. chem." 78, 1178–1184 (1940).